March 31, 1925.
A. STAATS
1,531,885
DIRECTION SIGNAL FOR MOTOR CARS
Filed June 25, 1924
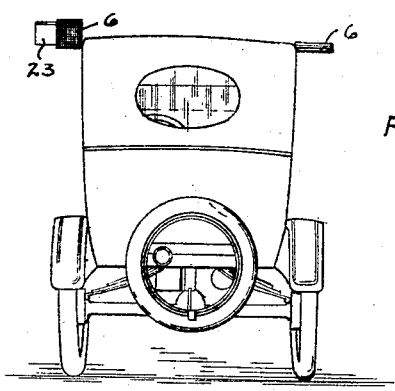
Fig. 1.
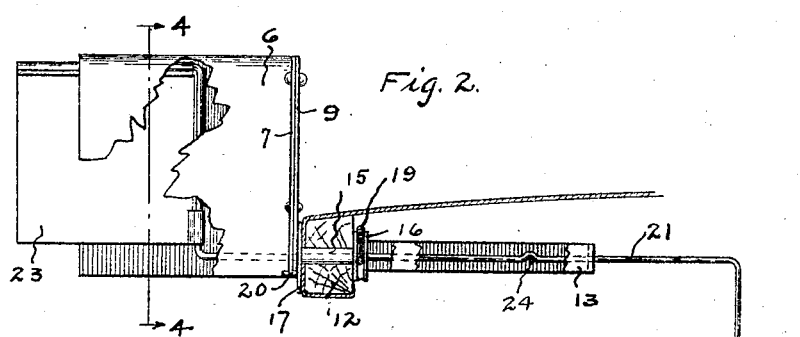
Fig. 2.
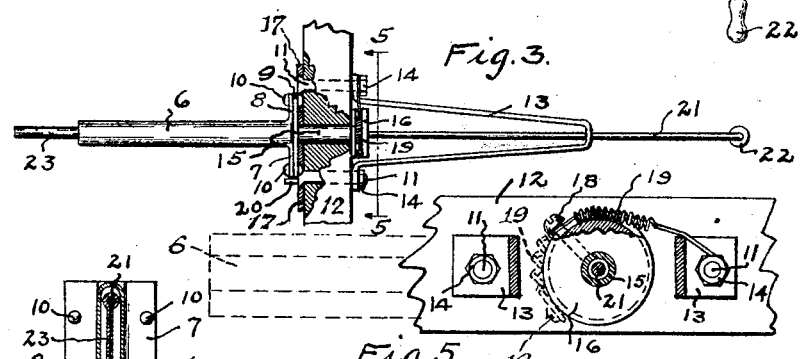
Fig. 3.
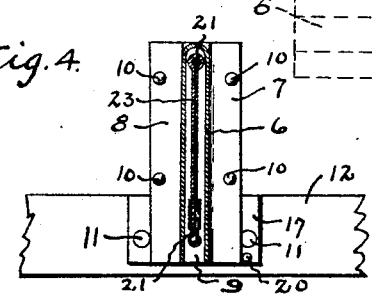
Fig. 4.
Fig. 5.
INVENTOR,
Albert Staats,
By Joseph A. Mintax
Attorney.

Patented Mar. 31, 1925.

1,531,885

UNITED STATES PATENT OFFICE.

ALBERT STAATS, OF INDIANAPOLIS, INDIANA.

DIRECTION SIGNAL FOR MOTOR CARS.

Application filed June 25, 1924. Serial No. 722,393.

*To all whom it may concern:*

Be it known that I, ALBERT STAATS, a citizen of the United States, residing at Indianapolis, in the county of Marion and State of Indiana, have invented new and useful Improvements in Direction Signals for Motor Cars, of which the following is a specification.

My invention comprises means of giving signals to indicate the direction toward which a vehicle is to move and the primary object of my invention is to provide such signalling means in a form and so operated that a signal will be unmistakably and positively displayed as to be visible from both front and rear of the vehicle.

The present mode of signalling to indicate the proposed new direction of a vehicle consists usually of extending the driver's hand, but in closed vehicles such signalling is impractical and in any vehicle, a turn to the right with the driver in the usual left hand position within the vehicle, can not clearly and unmistakably be indicated to be visible from both the front and the rear of the vehicle. To overcome this situation some cars have been equipped with a series of lamps on the rear and are usually operated in conjunction with travel of the clutch or brake pedals and so do not give a signal sufficiently far enough in advance of the change in direction to be of benefit and in any event are not visible from the front. In the usual operation of a vehicle, a direction-indicating signal visible from the front of an oncoming vehicle is as important as one visible from the rear.

My invention presents a highly visible signal from both front and rear, is easily and quickly installed at very little expense, and can be quickly operated without distracting the driver's attention from the roadway ahead. I accomplish these and such other objects as may become apparent in the following description by the means as illustrated in the accompanying drawing, in which—

Fig. 1 is the rear elevation of a motor vehicle of the closed body type with my direction signal mounted thereon and indicating a turn of the vehicle to the left; Fig. 2 is a side elevation of the direction signal enlarged from that shown in Fig. 1, and having fragments removed to permit showing of the inner construction; Fig. 3, a top plan view of the same; with a fragment of the top rail removed; Fig. 4 a vertical section through the outer portion of the signal taken on the line 4—4 in Fig. 2; and Fig. 5 a vertical section taken on the line 5—5 of Fig. 3 showing the spring return mechanism.

Like characters of reference indicate like parts throughout the several views.

I form a housing 6 having substantially an elongated U-section and provided with the laterally extending flanges 7 and 8 from each side wall. The housing 6 is secured in a vertical position with the closed side uppermost to a mounting plate 9 by means of the rivets 10 passed through the flanges 7 and 8 and the plate 9. A bearing plate 17 is secured to the side top rail or front bow 12 by means of the bolts 11 which pass through the top rail 12 and through the feet of the inside bracket 13 and there are secured by the nuts 14. The mounting plate is provided with a rigidly attached and inwardly extending hollow shaft 15 which is received with a sliding fit through a hole in the bearing plate and a continuing hole through the top rail 12 such that the end of the shaft 15 projects beyond the inside of the top rail 12 sufficiently to receive on its end the pulley 16. The pulley 16 is retained on the shaft 15 by the set screw 18 and thereby prevents the withdrawal of the shaft by contacting the top rail 12 with its inner face and so holds the mounting plate 9 in sliding contact with the bearing plate 17. A spring 19 having one end hooked under the head of the set screw 18 passes in the groove over the top of the pulley 16 and has its other end hooked under the nut 14, as in Fig. 5.

A stop pin 20 secured in the bearing plate 17 and outwardly projecting prevents the housing 6 from rotating forwardly about the axis of the shaft 15, and the spring 19 retains the housing 6 in a vertical position by pulling the housing against the spring, but with sufficient pressure to overcome the spring tension on the upper forward side of the housing, the housing may be rotated to revolve about its shaft axis to turn backwardly and downwardly, and as soon as the pressure is removed, the housing will immediately revolve back to its vertical position as determined by the spring 19 pulling the housing 6 back to contact the stop pin 20. Such action is provided to prevent damage to my direction signal should overhanging branches or like obstructions brush against it. Should the housing strike a branch, the spring will permit it to turn backwardly and slip under the branch without damage. The bracket 13 extends some appreciable distance within the vehicle and slidingly retains and supports by a hole through its inner end the rod 21 having its inner end bent downwardly to receive the handle or knob 22.

The rod 21 extends outwardly from the supporting end of the bracket 13 and passes with a loose fit through the central hole axially of the shaft 15 through the mounting plate 9, thence upwardly at right angles to be rigidly grasped and secured to the signal 23 along its inner edge, and thence outwardly to be grasped and secured along the top edge of the signal 23, as indicated in Fig. 2 of the drawing, where the upper edge of the signal 23 is represented as being rolled over the rod 21 and only a short section at the lower side of the rear or inner edge of the signal 23 is rolled over the rod 21, which means of fastening is found to be of ample support to incorporate the signal 23 rigidly upon the rod 21. The signal 23 is preferably made of sheet metal as is also the housing 6. The signal 23 may be of any desired color as white and the outer side of the housing black. In Fig. 2, the signal 23 is partially extended beyond the housing 6, and is fully displayed as shown by the left hand signal in Fig. 1.

The housing 6 is of just sufficient inside width to permit the signal to slide back and forth freely within, and the horizontal length of the rod 21 is such that the inner downwardly turned end upon which the handle 22 is mounted will contact the bracket 13 just before the inner edge of the signal 23 leaves the housing 6. At a point on the horizontal length of the rod 21 at a distance from the inner downwardly turned end equal to the distance travelled by the signal 23 from its concealed position within the housing 6 to its fully displayed position, I form a notch 24 such that it will engage over the edge of the hole in the bracket 13 through which the rod 21 passes, when the signal 23 is fully concealed and thereby effectively lock the signal in that position. A slight outward push will disengage the notched rod from the bracket hole edge.

One of my direction signals is mounted on each side of the vehicle near its forward end, and by its construction as described, each will extend above the top of the vehicle as illustrated in Fig. 1. The handles from the two signals will be conveniently located just above the driver's head near the center of the under side of the vehicle top, such that should the driver intend turning to the left, he raises his hand and pushes the left handle out to the left to give the signal position as in Fig. 1 and after making the turn, pulls the handle in to bring the signal 23 within its housing 6 to render it invisible. Similarly the driver may indicate a right turn by operating the right handle.

Having fully described my invention in the form now best known to me, though it is obviously capable of assuming different structural forms without departing from the spirit of the invention, what I claim as new and desire to secure by United States Letters Patent is:

1. In a vehicle direction signal, a housing mounted on the vehicle so as to be extended substantially above the top of said vehicle, a top side rail of said vehicle supporting said housing, signal means slidingly retained in said housing, means within said vehicle of extending said signal means from and drawing it back into said housing, and spring resisting means of retaining said housing in a vertical position, said spring resisting means being capable of being overcome by a predetermined pressure on the front side of said housing to permit said housing to tilt backwardly until such pressure is removed.

2. In a vehicle direction signal, a housing mounted on the vehicle so as to be extended substantially above the top of said vehicle, a top side rail of said vehicle supporting said housing, a shaft rigidly secured to said housing and pivotally secured to said top rail, signal means slidingly retained in said housing, means extending within said vehicle of sliding said signal means out of and into said housing, and spring means cooperating with said shaft and said top rail for the purpose of holding said housing in a vertical position and of permitting said housing to tilt backwardly about the axis of said shaft upon a predetermined pressure being exerted upon the front side of said housing.

3. In a vehicle direction signal, a housing substantially U-shaped in cross-section with laterally extended flanges, a closure mounting plate to which the housing is attached by means of the flanges with its closed side uppermost, a hollow shaft rigidly secured to said mounting plate near its lower edge, a top side rail of said vehicle adapted to pivotally receive said shaft, a stop adapted to be contacted by said mounting plate to prevent forward rotation of said housing through its pivoted shaft, a signal slidingly fitting within said housing, a signal control rod secured to said signal and passing through said shaft to within said vehicle for the purpose of operating said signal, a pulley detachably secured on said shaft on the inner side of said top rail, said pulley having an annular circumferential groove therein, and a spring passing in and along a portion of said groove, said spring being secured by one end to said pulley and by the other end to said top rail, thereby providing a yielding means of retaining said housing in a vertical position against said stop and of permitting the backward rotation of said housing upon the exertion of sufficient pressure upon its forward side.

4. In a vehicle direction signal the combination with a vehicle frame member of a housing pivotally mounted on the vehicle frame member, signal means slidingly retained in said housing, spring means cooperating with said housing and said vehicle frame member for the purpose of yieldingly retaining said housing in a vertical position so as to permit the backward rotation of said housing pending the application of a predetermined pressure upon the forward side of the housing, a signal control rod attached to said signal means and extended within said vehicle, a bracket within said vehicle to support the said control rod and means for locking said rod in a predetermined position, said means comprising the utilization of the spring of the said rod to permit engaging and disengaging of a notch in the rod over the edge of the hole in said bracket through which the rod passes.

5. In a vehicle direction signal, a supporting member of the vehicle, a housing substantially U-shaped in cross-section, closed at the top and open at the bottom, and having the inner side next the supporting member closed, flanges extending from the housing adapted to contact said supporting member, an indicating slide fitting within said housing, a horizontal shaft supporting said slide, said shaft extending slidably through the inner closed side of the housing to within the vehicle, a bracket secured within the vehicle having a bearing to slidably receive and support the inner portion of said shaft, a lip on the bracket, means on said shaft adapted to engage with the lip on said bracket whereby said slide is held in a predetermined position, and a handle on said shaft.

Signed at Indianapolis, county of Marion, State of Indiana, this the 18th day of June, 1924.

ALBERT STAATS.